US012784616B1

(12) United States Patent
Coyle et al.

(10) Patent No.: US 12,784,616 B1
(45) Date of Patent: Nov. 3, 2026

(54) BIOMECHANICALLY REALISTIC BRAIN MODELS

(71) Applicants: Brian Michael Coyle, Canyon, CA (US); Alys Larsen, Canyon, CA (US)

(72) Inventors: Brian Michael Coyle, Canyon, CA (US); Alys Larsen, Canyon, CA (US)

( * ) Notice: Subject to any disclaimer, the term of this patent is extended or adjusted under 35 U.S.C. 154(b) by 0 days.

(21) Appl. No.: 19/264,598

(22) Filed: Jul. 9, 2025

(51) Int. Cl.
*G09B 23/30* (2006.01)

(52) U.S. Cl.
CPC .................................... *G09B 23/30* (2013.01)

(58) Field of Classification Search
CPC ................................ G09B 23/28; G09B 23/30
See application file for complete search history.

(56) References Cited

U.S. PATENT DOCUMENTS 6,965,235 B1 * 11/2005 Guclu .................... G01R 33/58 324/318
8,105,089 B2 * 1/2012 Hudson .................. G09B 23/34 434/274
8,535,062 B2 * 9/2013 Nguyen ................. G09B 23/30 434/267
10,049,601 B2 8/2018 Chanda et al.
10,145,677 B2 * 12/2018 Wu ........................ G09B 23/30
11,373,552 B2 * 6/2022 Magsood ............... G01R 33/58
11,521,519 B2 * 12/2022 Mathaneswaran ..... G09B 23/30
2007/0148633 A1 * 6/2007 Sakezles ............ G01N 33/5438 702/19
2012/0070814 A1 * 3/2012 Iida ........................ G09B 23/30 434/270
2016/0005169 A1 * 1/2016 Sela ..................... A61B 5/0066 382/131
2016/0155364 A1 * 6/2016 Piron ..................... G01R 33/58 434/270
2023/0278291 A1 * 9/2023 Thiong'o ............... B33Y 50/00 264/408
2024/0296755 A1 * 9/2024 Hadimani .............. G09B 23/30
2025/0124816 A1 * 4/2025 Papadelis ............. G09B 23/286

OTHER PUBLICATIONS

Peer, M.; Nitzan, M.; Bick, A.S. et al., Evidence for Functional Networks within the Human Brain's White Matter, Journal of Neuroscience, 2017, 6394-407, 37(27).

(Continued)

*Primary Examiner* — Kurt Fernstrom

(57) ABSTRACT

A biomechanically realistic brain model for impact testing comprises white matter simulant materials and gray matter simulant materials positioned to correspond with anatomical brain structure. The white matter simulant comprises anisotropic hydrogels with embedded magnetically-responsive, electrically-responsive, thermally-responsive, and/or mechanically-responsive particles that exhibit directionally-dependent stress-strain responses. The gray matter simulant comprises isotropic hydrogels or silicones, particularly siloxanes, that exhibit uniform stress-strain responses to applied forces. The materials are cast, injected, printed, or formed in anatomically correct positions and share realistic interfaces. The brain model accurately imitates physical brain responses during impact tests, particularly angular impacts, providing realistic testing results for biomechanical analysis.

18 Claims, 6 Drawing Sheets

(56) References Cited

OTHER PUBLICATIONS

Giordano, C. & Kleiven, S., Evaluation of Axonal Strain as a Predictor for Mild Traumatic Brain Injuries Using Finite Element Modeling Stapp Car Crash Journal, 2014, 29-62, vol. 58.
Alisafaei, F., Gong, Z., Johnson, V.E., et al., Mechanisms of Local Stress Amplification in Axons near the Gray-White Matter Interface, Biophysical Journal, 2020, 1290-1300, 119(7).
Sano, K., Ishida, Y., Aida, T., Synthesis of Anisotropic Hydrogels and Their Applications, Angewandte Chemie International Edition, 2018, 2532-43, 57(10).
Bayly, P.V., Cohen, T.S., Leister, E.P. et al., Deformation of the human brain induced by mild acceleration, Journal Neurotrauma, 2005, 845-56, 22(8).
Chanda, A., Callaway, C., Clifton, C. et al., Biofidelic human brain tissue surrogates, Mechanics of Advanced Materials and Structures, 2018a, 1335-1341, 25(15-16).
Chanda, A., Biomechanical Modeling of Human Skin Tissue Surrogates, Biomimetics, 2018b, 18-30, 3(3).

* cited by examiner

BIOMECHANICALLY REALISTIC BRAIN MODELS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

CROSS-REFERENCE TO RELATED APPLICATIONS

Not Applicable

BACKGROUND

Physical head models are essential for studying traumatic brain injuries (TBI) due to ethical and biological limitations of animal studies. Finite Element (FE) models aren't yet sophisticated enough to capture brain biomechanics.

Existing physical brain models use gel or silicone materials formed into ovoid shapes. They may have surface undulations that mimic brain surfaces. Some models incorporate fluids, that represent cerebrospinal fluid. Model brains often have model skulls around them.

Real brains are heterogeneous structures. Their primary constituents are gray matter and white matter, which have different biomechanical characteristics. Gray matter consists of neuronal cell bodies and is considered isotropic. White matter consists of aligned axonal fibers and is considered anisotropic. Gray matter contains the majority of neurons in the brain, and their dendrites, axons, and interneuron synapses, supported by glial cells and capillaries. White matter is composed of mostly long-distance axons that transport information for inter-brain coordinated activity. The white color is due to white myelin protecting these axons.

White matter axons are organized into tracts, like cables running in a specific direction through the brain. White matter has been further divided into groups based on the alignment of these fibers. For example, the superior longitudinal fasciculus (SLF) connects frontal lobes to parietal and occipital lobes at the rear of the brain. Its axon tracts are aligned horizontally, from front to back. The corticospinal tract axons run from the brain to spinal cord, its fibers aligned vertically. The uncinate fasciculus involves long axon fibers that bend from the orbital frontal cortex around to the anterior temporal lobe and back to the amygdala (Peer et al., 2017, 1.)

Brain tissue deformation has consistently been shown to occur when white matter axon tracts are strained along their alignment direction. This directional strain is anisotropic, meaning that axon tracts respond differently depending on the direction of impact force. Rotational TBI is associated with anisotropic orientations of axonal fibers. As impacts extend a fiber along its pathway it thins, and if bent or twisted can fail. Impacts perpendicular to a tract compress fibers, which does not greatly heighten failure risk. For a data set of mild TBI from the National Football League, strain in the axonal direction was found to be a better injury predictor than maximum strain, averaged strain, or cumulative strain (Giordano & Kleiven, 2014, 2.)

White matter brain tissue is anisotropic and deforms according to impact orientation. Gray matter is largely composed of dispersed axons neuronal cell bodies and non-aligned dendritic projections, all of which are isotropic in orientation.

Human gray and white matter volume, cortical area, location, and architecture are consistent at the general population levels of humans, as it is (although different) in other primates. Variation in the fine-grained level of the depth or shape of brain foldings may occur between subjects, but not overall structural organization. The parts of human brains that vary least in relative size are gray areas with the most white matter connections to other parts of the brain.

Given brain positions, areas with gray and white matter can have extensive surface contact where biomechanical interactions occur. The angular momentum of a brain around its mass center imposes strain between white and gray matter due to their different biomechanical responses. Strain concentrations occur at their interfaces. This mechanical mismatch increases white matter anisotropic strain. From a purely physical perspective, the main factors that govern strain propagation at an interface between two materials is the degree of mismatch in the elastic properties of the materials. Computation models predict gray-white matter interfaces, which axons intersect and where each matter has mechanical differences, impose amplified stress-strain on axons. The long, thin architecture of axons, bundled in extensive organized tracts, and their viscoelastic nature, increases damage from shear and tensile forces as the brain is rapidly deformed (Alisafaei et al., 2020, 3.)

More severe local injury occurs near white and gray matter boundaries. The architecture of brain matter is a significant factor in impact studies. The gray-white matter interface represents an area where mechanical mismatch of adjoining tissues occurs, and where there is the greatest risk of white matter damage. Soft and hard materials have different stress-strain responses to mechanical forces, and mechanical instability occurs at their interface. The mismatched stress moduli can take a long distance (up to centimeters) to reach equilibrium, during which material damage occurs (Bayly et al., 2005, 4.)

As brain tissue deforms under rotational acceleration, softer gray matter pulls the stiffer white matter along. This stiffness, while preventing axon deformation, imposes higher tensile stress on axons. Gray matter pulling the white matter causes greater tensile elongation of axons, compared to areas of white matter more isolated from gray matter.

There is a demand for a brain model which can more accurately respond to impacts than gel, silicone, or foam model brains with a homogeneous mechanical response. There is also a demand for brain models which are biomechanically realistic and can be easily reused. In the past, this need was not met by using cast forms, because materials used did not provide the necessary mechanical responses.

Blast studies with physical models generally use silicones as artificial brain material polymers. Medical studies with physical brain models often use hydrogel polymers. Silicones are often stiffer than hydrogels; superficially, this aspect makes the former resemble white matter and the latter gray. But there is a more important variable, their behavior when suddenly loaded. It is critical that any material representing white matter respond anisotropically, with its modulus lowest in the direction the white matter axons in that brain component are aligned. This is the condition that causes axons to deform.

Prior to 2015, existing silicones and hydrogels all responded isotropically. Brain models made of one or the other respond isotropically. However the use of hydrogels in reconstruction and rehabilitation medicine then led to the recent development of hydrogels with anisotropic response to applied loads. Many metazoan tissues possess anisotropic structure, from molecular to macroscopic levels. With hydrogels often explored as scaffolds for dynamic living tissues, numerous methods fabricate anisotropic gels that can move accordingly. This usually requires managing hydrogel synthesis with some type of external force. The hydrogel contains components that can be directed into position with external stimuli, such as mechanical forces, magnetic and electric fields, and gradients of temperature and ions (Sano et al., 2018, 5.)

A single hydrogel formed under a unified external force cannot form an entire brain, as this would bias the model brain to a single anisotropic direction. But anisotropic hydrogels formed with different anisotropic directionalities can mimic white matter components in brains. Silicones are limited to isotropic response, and they can be made as soft as hydrogels.

U.S. Pat. No. 11,373,552 to Magsood et al. (P1) disclosed a model brain for electrically modeling transcranial magnetic stimulation, the disclosure using conductive fillers to make materials with different conductivities to represent gray matter and white matter conductivities.

There is a need for a model brain to biomechanically model brain impacts, in which biomechanical mimicry is enabled with anisotropic and isotropic polymers that correspond to the mechanical response of white and gray matter, arranged in a biomimetic structure.

Chanda et al. claimed that they developed silicone-based materials, called siloxanes, which mimicked the nonlinear mechanical behavior of human gray and white matter tissues. In fact these two-part silicone compositions only characterize different strain rates. These materials do not exhibit anisotropic biomechanical responses. Chanda et al. noted all of their compositions are purely isotropic, and anisotropy effects cannot be incorporated in such a material system (Chanda et al., 2018a, 6.) These siloxanes were disclosed in U.S. Pat. No. 10,049,601 to Chanda (P2) as skin simulants to mimic the mechanical properties of vaginal skin tissues. In a later publication Chanda et al. noted these skin simulants do not exhibit anisotropic responses (Chanda et al., 2018b, 7.)

There is a need for a model brain to biomechanically model brain impacts, in which biomechanical mimicry is accurately represented with different polymers that correspond to the anisotropic and isotropic biomechanical responses of white and gray matter, arranged in a biomimetic structure.

SUMMARY OF THE INVENTION

The biomechanically realistic brain models [model brains] of this invention can be used for impact tests, particularly angular impact tests, and will accurately imitate real brain physical responses to impacts. The white matter simulant material (WMSM) used to represent white matter are anisotropic hydrogels and//or polymers composed with embedded magnetically-responsive, electrically-responsive, thermally-responsive, and/or mechanically responsive particles, all (when formed) having an directionally-dependent stress-strain response to applied forces, called an anisotropic response. The gray matter simulant material (GMSM) used to represent gray matter are isotropic hydrogels or silicones, particularly siloxanes, having an isotropic stress-strain response to applied forces, called an isotropic response. These materials are cast, injected, printed, formed, and/or placed in positions corresponding to where the brain matter they represent is positioned in real brains. These materials share interfaces like real brains, so that impacts have realistic results. In a preferred embodiment, the model brains are inserted in model skulls, the model skulls mimicking real human skull mechanical response, and the model brains have a membrane-formed fluid-filled sealed cavity between the model brain and model skull to mimic real membrane-formed cerebrospinal fluid-filled cavities.

As used herein, the term "hydrogel" or "hydrogels" refers to a three-dimensionally cross-linked polymeric network capable of absorbing, retaining, and releasing water while maintaining structural integrity and dimensional stability. Hydrogels are characterized by their capacity to absorb aqueous solutions in amounts ranging from approximately 10% to over 1000 times their dry weight without dissolution, while exhibiting viscoelastic properties in the hydrated state. The polymeric network of a hydrogel comprises hydrophilic polymer chains that are cross-linked through physical associations, chemical bonds, ionic interactions, or combinations thereof. The polymer matrix may consist of homopolymers, copolymers, interpenetrating polymer networks, semi-interpenetrating polymer networks, or polymer blends. The cross-linking density and polymer composition determine the mechanical properties, swelling behavior, and permeability characteristics of the hydrogel.

In certain embodiments, hydrogels exhibit thermodynamically favorable behavior wherein the polymer network decreases in entropy upon expansion due to the conformational constraints imposed by cross-linking. Hydrogels that are formed, processed, or maintained under external forces in a stretched or deformed state demonstrate enhanced responsiveness to external stimuli, including but not limited to mechanical forces, temperature variations, pH changes, ionic strength modifications, or the presence of specific molecular species. For purposes of this specification, hydrogels include both synthetic and naturally-derived polymer systems, responsive and non-responsive formulations, and temporary or permanent cross-linked networks, unless explicitly stated otherwise.

For purposes of this disclosure, materials that may function as or be incorporated into hydrogels include, but are not limited to: hydrophilic polymers (such as polyethylene glycol, polyvinyl alcohol, polyacrylamide, or polyacrylic acid), interpenetrating polymer networks (IPNs), semi-interpenetrating polymer networks (semi-IPNs), polymeric fibers, elastomeric materials including silicone rubber and natural rubber, and combinations thereof. The hydrogel materials may be synthetic, naturally-derived, or hybrid compositions combining both synthetic and natural components.

It is known in the art that metazoan tissues demonstrate anisotropic organization across multiple hierarchical scales, ranging from molecular to macroscopic dimensions. Prior art hydrogel compositions have been investigated as scaffolds for dynamic tissue applications, resulting in various approaches for fabricating anisotropic gel structures configured to exhibit directionally-dependent responses to applied mechanical forces.

Embodiments of this invention include anisotropic hydrogels fabricated with the application of external forces during hydrogel synthesis to direct constituent components into desired orientations, which corresponds to white matter in a human brain. Various external stimuli can be employed for this purpose, including mechanical forces, magnetic fields, electric fields, and gradients of temperature and ionic concentration. An embodiment uses shear forces applied to orient nanofibers and nanofillers during in situ polymerization in dispersions. An embodiment electrically orients electrically conductive nanofillers in dispersions, resulting in thin hydrogel films that are arrayed together. An embodiment uses magnetic orientation techniques as a non-contact, non-destructive consistent force that penetrates homogeneously into samples. This approach enables synthesis of anisotropic hydrogels with various dimensions, thicknesses, and shapes. An embodiment employs magnetic fields to fabricate composite hydrogels with anisotropic mechanical properties by incorporating negatively charged unilamellar titanate nanosheets into positively-charged gels. This involves aligning nanosheets in aqueous colloidal dispersions under magnetic field influence, followed by light-triggered in situ polymerization.

Embodiments use photochemical approaches for anisotropic hydrogel fabrication. An embodiment uses UV radiation to aggregate ligand-silver nanocomposites into elongated two-dimensional lamellar assemblies within polyacrylamide solutions. An embodiment incorporates aligned electrospun nanofiber mats in hydrogels.

An embodiment uses freeze-casting techniques, such as directionally freezing a poly(N-isopropylacrylamide) monomer with clay platelets to create anisotropic ice crystal growth patterns. These hydrogels have highly aligned porous structures at micrometer scales and nacre-like layered structures at nanoscales, exhibiting enhanced tensile strength along alignment directions compared to perpendicular orientations, as white matter does.

An embodiment may assemble the biomechanically realistic monomers and polymers by hand. To form these model brains in a reproducible and fast manner, a preferred embodiment uses a CAD program to guide a 3D printer or servo-controlled injection machine. An embodiment uses a printer or servo-controlled machine with multiple printing or injection heads, each provided with either GMSM or WMSM, or can use a single printing or injection head and shift between different materials. Embodiments print, inject, or cast anisotropic hydrogels so their modulus is biased as is the white matter in the model brain. An embodiment may print, inject, or cast material onto a surface, the material serving as support for different material later inserted in internal recesses, voids, or empty spaces. This includes printing, injecting, or casting isotropic material first, then inserting anisotropic hydrogels with biased moduli in the remaining recesses, voids, or empty spaces. The opposite process may also occur, with anisotropic material first printed, injected, or cast with recesses, and isotropic material inserted in the recesses.

Embodiments of the model brain may have different materials cast simultaneously, in place. Polyvinyl alcohol (PVA) can be 3D printed as the mold. Because it is water soluble, PVA molds can be dissolved away, leaving behind the cast material. Different complex brain architectures can be 3D printing this way. Isotropic or anisotropic hydrogels or other materials are funneled, piped, or injected in mold components. Once the materials have taken shape, the PVA mold is dissolved.

In an embodiment the WMSM and GMSM are positioned in a target location in liquid monomeric form. Polymerization is triggered, and polymers form in their final position. This embodiment can accurately reproduce the complex geometry of brains with great detail. An embodiment uses external forces to orient particles in liquid, and in situ polymerization freezes this orientation in the final hydrogel network, which results in model components having permanent, unique, specific anisotropy or isotropy.

In an embodiment a model brain composed of different simulating materials, anisotropic and isotropic, can be made with separate molds for the material simulating white matter and gray matter. Once the different materials are cured, they can be removed from molds, and assembled together, in one embodiment having interfaces formed with a hydrogel adhesive. This can be done like a wedding cake, on a turntable, lowest level first. At each level, one type of brain matter is placed in position leaving recesses or voids for the other brain matter, which is then inserted in the recesses or voids. Embodiments fix the positions of WMSM components and GMSM components and may establish their interfaces with fixing material, such as adhesives.

In order to achieve the goal of positioning different monomer and polymer materials in a model brain as white and gray matter components are positioned in human brain, in an embodiment a computerized brain basis model is used. Data in the computer model may be from structural magnetic resonance images taken in a transverse plane. These can provide detailed brain tissue characterization, using FLAIR, diffusion tensor imaging, and high-resolution 3D acquisitions that enhance gray-white matter contrast and reveal microstructural details. In these images of brain slices, white matter appears bright/hyperintense, while gray matter appears darker/hypointense. Other methods may be used to capture brain images, including computed tomography, x-ray, or ultrasound. The imaged brain slices are direct representations of human brains. Each imaged brain slice is indexed, with a marker such as "x," and a layer of the brain model is assigned the marker to associate it with the indexed slice.

An embodiment uses the computerized basis model to reproduce the slice data layer-by-layer, using print, injection, or casting, to produce a biomechanically realistic brain model. Each layer can be made with a combination of two or more materials. The material constituents can be adjusted to be biomechanically consistent with the real brain. The computer that drives material deposition or placement uses the basis model to direct the motion of print or injection heads on specific paths, or distribute particles in liquid in specific groups.

The use of external forces to orient anisotropy in materials can be applied to additive manufacturing. An embodiment incorporates a three-dimensional printer that incorporates one or more systems that impose external fields, gradients, or forces on a printer substrate. This guides WMSM material when deposited to have a specific anisotropic directionality.

In an embodiment, a WMSM material includes magnetic particles (magWMSM). A magnetic field is imposed when magWMSM is deposited, which orients the magWMSM anisotropic directionality. In an embodiment, a WMSM material includes conductive particles (conWMSM). An electrical field is imposed when conWMSM is deposited, which orients the conWMSM anisotropic directionality. In an embodiment, a WMSM material includes thermally responsive particles (thermWMSM). An thermal gradient is imposed when thermWMSM is deposited, which orients the thermWMSM anisotropic directionality. In an embodiment, a WMSM material includes mechanically responsive particles (mechWMSM). A mechanical force is imposed when mechWMSM is deposited, which orients the mechWMSM anisotropic directionality.

An embodiment incorporates a three-dimensional printer that imposes a static external field, gradient, or force on the printer substrate. This allows WMSM anisotropic directionality to be imposed on a WMSM subcomponent in one dimension. The WMSM subcomponent is then removed and reoriented for placement in a model brain assembly.

In another embodiment, the printer is configured with one or more systems that impose external fields, gradients, or forces from above, to the sides, and/or below the print substrate that material is deposited on. This allows different WMSM anisotropic directionalities to be imposed on different WMSM subcomponents. In a further embodiment this allows one or more subcomponents to be deposited within the model brain assembly, and avoids the need for subcomponent reorientation and placement in a separate model brain assembly.

An embodiment incorporates a three-dimensional printer that imposes a dynamic external field, gradient, or force. As potentially anisotropic material is deposited, the dynamic field, gradient, or force is modified in more than one dimension. For example, in an embodiment the printer has a structure that moves a magnetic system around the printer. This allows WMSM anisotropic directionality to be altered in more than one dimension. In an embodiment the deposed material is on a printer substrate that can be rotated within a static external field, gradient, or force that governs WMSM anisotropic directionality. This allows WMSM anisotropic directionality to be altered in two dimensions. In another embodiment, the printer substrate can be rotated within an external field, gradient, or force that can change vertical position. This allows WMSM anisotropic directionality to be altered in more than two dimensions. In another embodiment, the printer substrate can be rotated within one or more systems that impose external fields, gradients, or forces, that that may be above, to the sides, or below the printer substrate. This allows WMSM anisotropic directionality to be altered in more than two dimensions.

An important part of a human brain is the cerebral spinal fluid (CSF) that surrounds it, and flows out of areas in the brain. This plays a critical physiological role, draining molecular impurities. Regarding model brains for impact tests, the CSF plays other roles. The CSF reduces a brain's effective weight from its normal 1,500 grams to a much lower 50 grams. This weight reduction changes impact force during mechanical injury. Also, a brain is enveloped in CSF. This cushions the brain.

However the CSF does not saturate a brain. Instead it is contained in delicate membranous barriers that surround it. Membrane barriers, above and below the arachnoid and dura maters, contain CSD. Membrane barriers above and below the pia mate contain CSE Rather than try to seal the model brain and inject fluid into it, a set of membranes, each membrane ~1 mm thick, can be used, that form a sealed cavity between them. Fluid can be injected into the sealed cavity. The membranes can then positioned over the outer portion of the model brain, next to the skull.

A model brain is inserted into a model skull for testing. A real human skull is composed of two types of bone, trabecular and cortical. Trabecular is porous, spongy, and lightweight. Cortical bone is denser, with an organized microstructure for stability and rigidity. In skull bones, two layers of cortical bone sandwich a layer of trabecular; this inner layer is called diploe in the skull.

While various composites can accurately mimic skull bones, a more biofidelic model can use a sandwich-like system of materials. The density of any 3D material can be altered during printing. The skull could be printed with a narrow dense surface, on top of which is printed a more sparse surface, on top of which is a thicker, dense surface. Because different print densities correlate with different mechanical response, this could reproduce accurate skull bone dynamics. Alternatively, different materials could be assembled together.

The model brains of this invention combine anisotropic hydrogels for white matter regions, isotropic materials for gray matter regions, realistic interfaces between materials (where most damage occurs,) cerebrospinal fluid simulation in membranes, and a material sandwich for skulls. The performance of the brain models is in some degree dependent on how the different materials are assembled together. Embodiments accurately reproduce brain components, their scale, their positions, and their interfaces. There has thus been outlined, rather broadly, the more important features of the invention in order that the detailed description thereof that follows may be better understood and in order that the present contribution to the art may be better appreciated.

BRIEF DESCRIPTION OF THE FIGURES

The present invention will be understood and appreciated more fully from the following detailed description taken in conjunction with the drawings in which.

DETAILED DESCRIPTIONS

Figure 1:
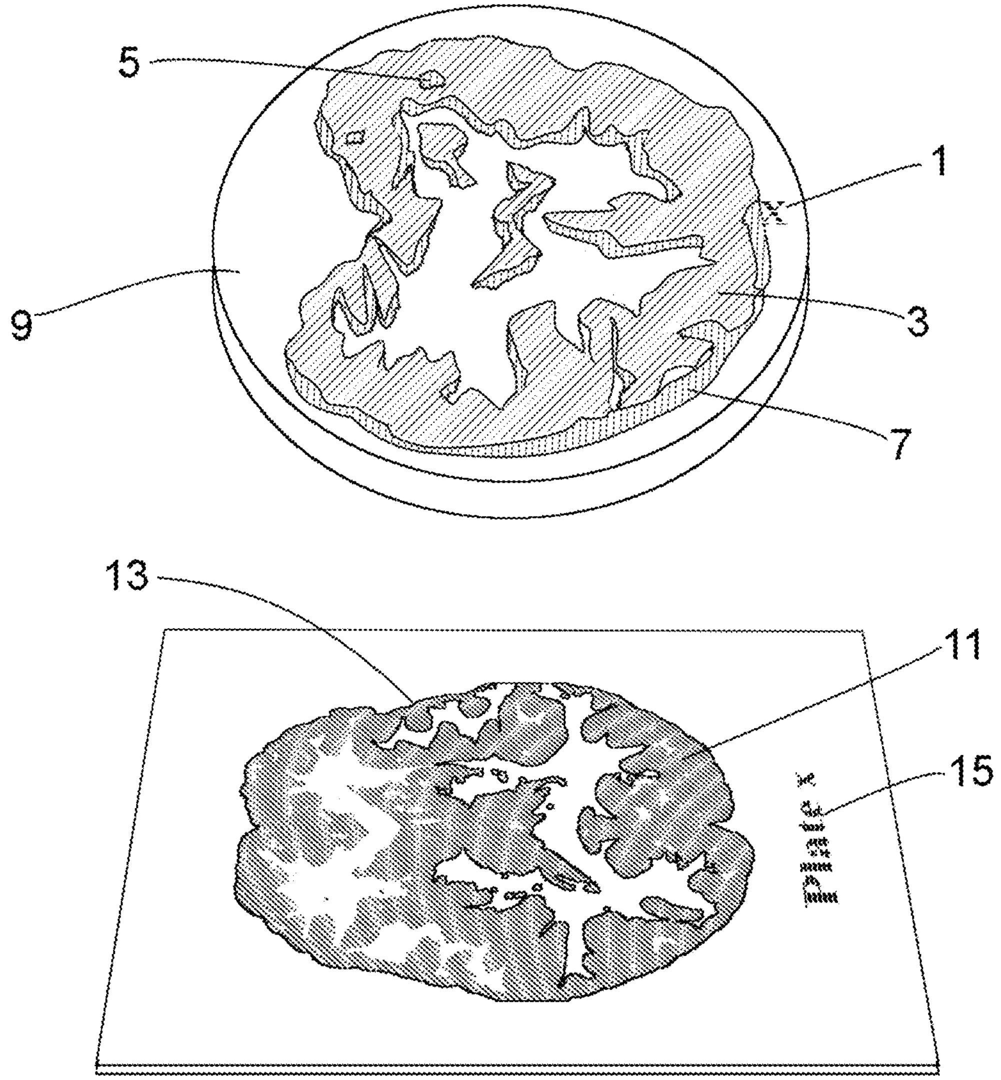
FIG. 1 illustrates an assembly layer of the biomechanically realistic brain model.

In an embodiment shown in FIG. 1, a layer "x" 1 of a model brain may be partially composed of gray matter simulant components 3. Simulant components may be separated or have voids 5, and the perimeter 7 of simulant components 3 of the layer "x" 1 define a part of the outer surface of the layer "x" 1. The material that comprises gray matter simulant components 3 is an amorphous monomer or polymer, having an elastic modulus less than 2 MPa. Examples of suitable substrates for GMSM include silicones, siloxones, gels, etc., that have an isotropic response to mechanical impacts. In the embodiment the GMSM components 3 of layer "x" 1 are positioned on a base 9. The pattern of the GMSM components 3 follow the pattern of gray matter 11 in an imaged brain slice 13 labeled "Plate x" 15. The imaged brain slice 13 is drawn from a human brain scan, and the imaged brain slice 13 is in the same position relative to the rest of the scanned human brain that the layer "x" 1 of the model brain is positioned relative to the rest of the model brain when the model brain is completed.

Figure 2:
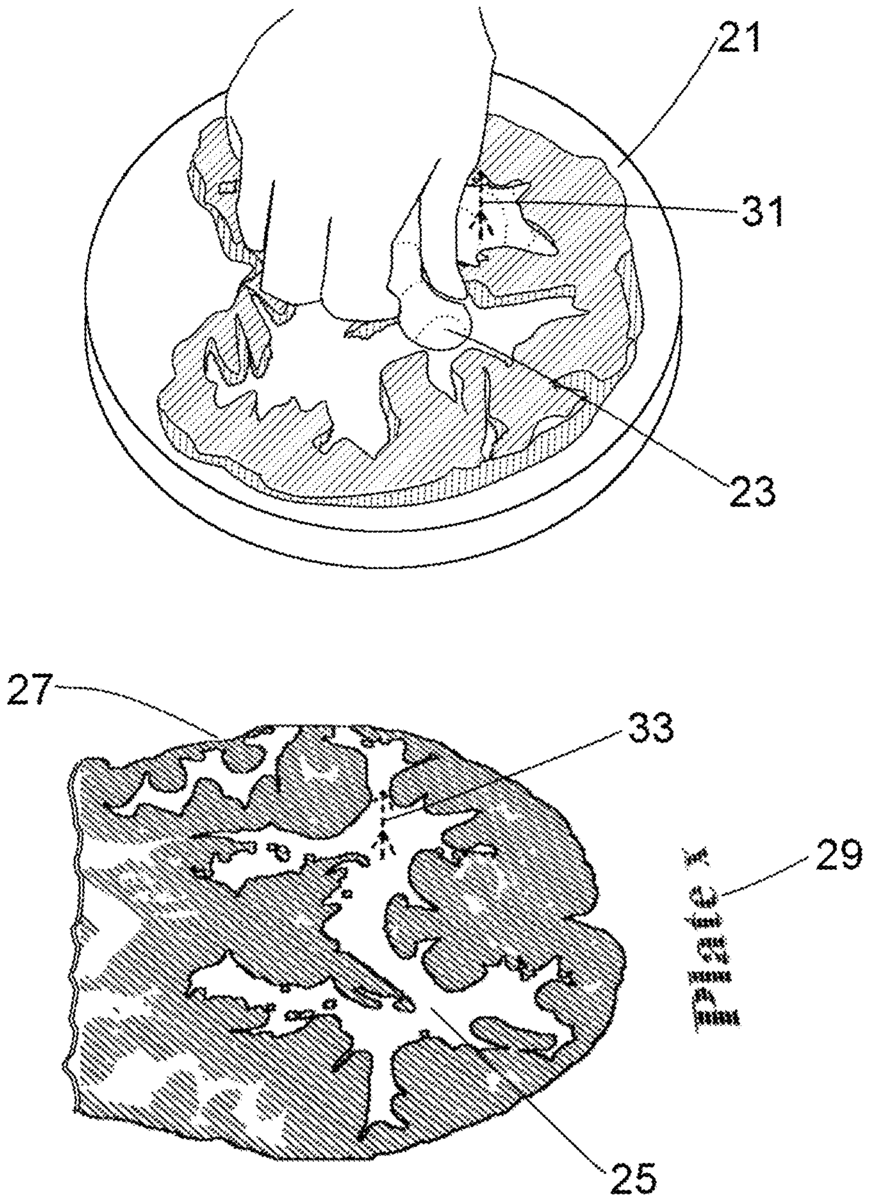
FIG. 2 illustrates a filling in of the assembly layer of the biomechanically realistic brain model.

In an embodiment shown in FIG. 2, a layer "x" 21 of the model brain is shown in cross section. In one embodiment, WMSM components 23 are placed in positions following the pattern of white matter 25 in an imaged brain slice 17 labeled "Plate x" 29. Examples of suitable substrates for WMSM include hydrogels having an anisotropic response to mechanical impacts. The directional orientation 31 of the anisotropic hydrogel's reduced strain in the brain model layer "x" 21 corresponds to the directional orientation 33 of bundled axon fibers of white matter 25 in "Plate x" 29.

Figure 3:
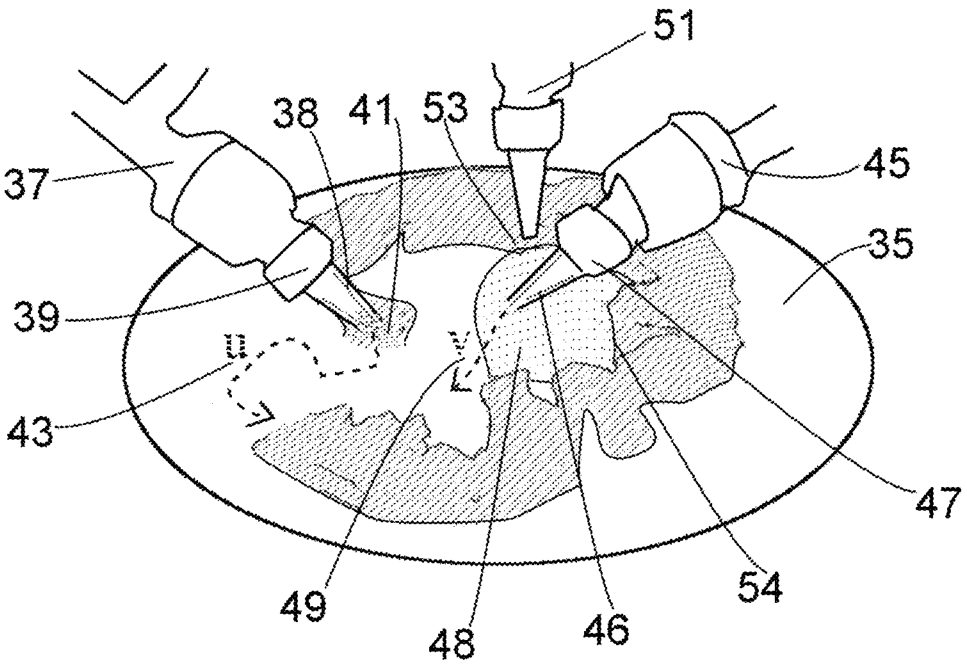
FIG. 3 illustrates an automated assembly of the biomechanically realistic brain model.

In an embodiment shown in FIG. 3, a main configuration of an automated system for injecting brain simulant materials to form a model brain is illustrated. According to one embodiment of the present invention, module 37 activates injector 39 to transmit GMSM 41 through a tube 38 onto a path "u" 43. Module 45 activates injector 47 in unit 45 to transmit WMSM 48 though a tube 46 onto a path "v" 49. Fixing module 51 applies sealant or an attachment material at interfaces such as 53 and 54 where GMSM 41 and WMSM 48 face each other. One or a plurality of servo motors are configured to drive each module's position, activation, and WMSM 48 anisotropic directionality.

Figure 4:
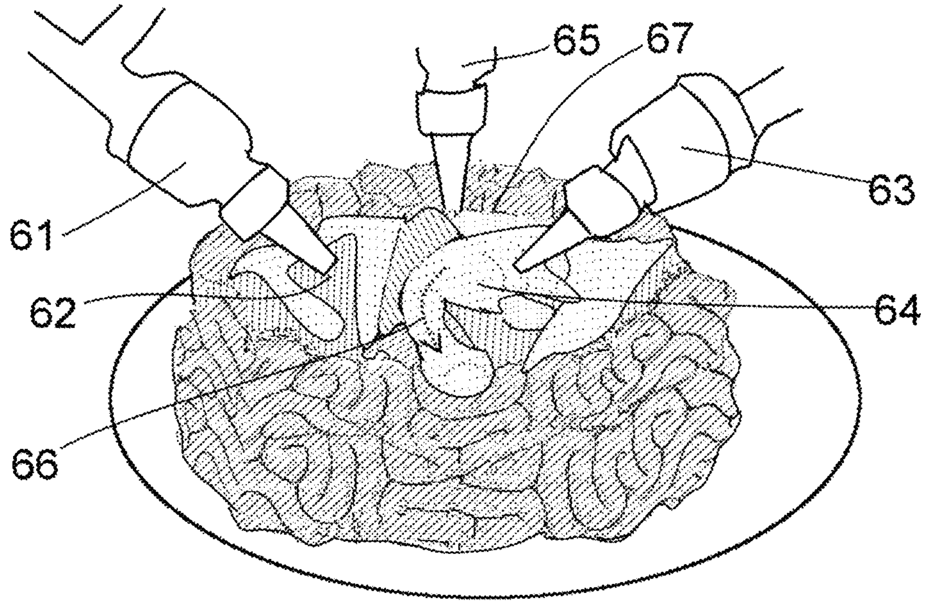
FIG. 4 illustrates an automated assembly of the biomechanically realistic brain model.

In an embodiment shown in FIG. 4, a main configuration of an automated system for injecting brain simulant materials is illustrated with much of the assembly concluded. Module 61 injects GMSM 62, and module 63 injects WMSM 64 with a specific anisotropic directional orientation 66. Fixing unit 65 applies sealant or an attachment material at interfaces 67 of white and gray matter simulant materials. One or a plurality of servo motors are configured to drive each module's position, activation, and WMSM 64 anisotropic directionality 66.

Figure 5:
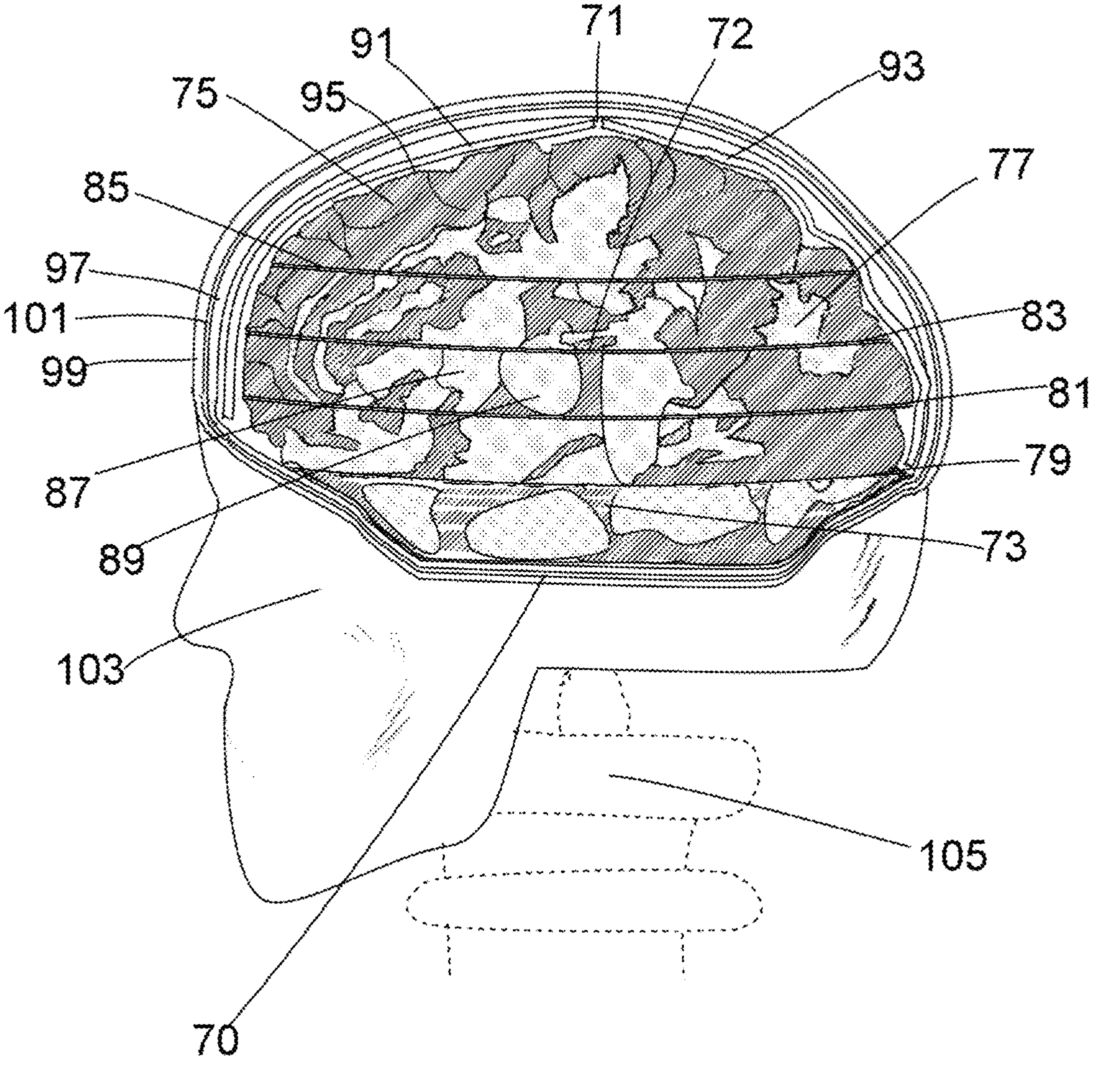
FIG. 5 illustrates a cut-away view of an assembled biomechanically realistic brain model.

The embodiment in FIG. 5 is illustrated with a completed head form 70 containing a model brain 72, in a partial cutaway showing a sagittal slice 71 in the upper part of the head form 70, and a transverse slice 73 across the middle of the head form 70. GMSM 75 and WMSM 77 are distributed following brain scan slices. Each WMSM 77 component is positioned with an anisotropic directionality. For example the WMSM component 87 and the WMSM component 89 have different directional anisotropic orientations. In the embodiment the model brain 72 is constructed layer-by-layer, with a first layer 79, a second layer 81, a third layer 83, and a fourth layer 85. An embodiment has a first membrane surrounded sealed cavity containing fluid 91 and a second membrane surrounded sealed cavity containing fluid 93 directly opposite the outermost surface 95 of the model brain 72.

In the embodiment in FIG. 5 the model brain 72 is surrounded by a model skull composed of an inner dense surface 97 and an outer dense surface 99 that sandwich a less dense inner surface 101. The outer surface of the outer dense surface 99 forms a head shape surface 103, which may be connected to a model neck 105 for impact testing.

Figure 6:
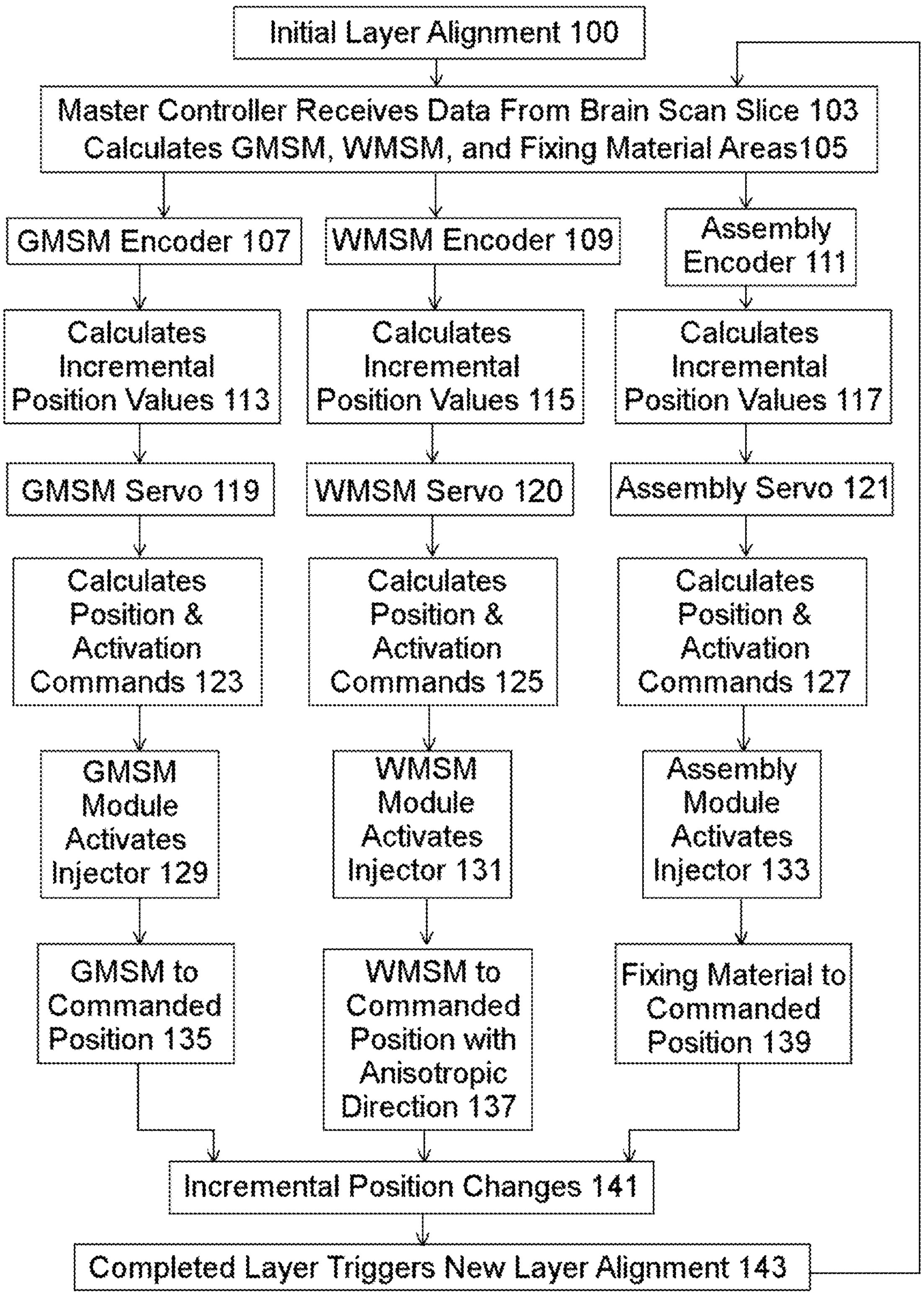
FIG. 6 is a flow chart of the process of assembling a biomechanically realistic brain model.

FIG. 6 is an exemplary process flow chart to illustrate the control steps an automated model brain assembly. The control process begins by determining an initial alignment of a first layer 100. A first brain scan slice provides data to a master controller 103. The master controller 103 calculates the three-dimensional areas of GMSM, WMSM, and fixing material 105. The geometric area of GMSM is sent to the GMSM encoder 107, the geometric area of WMSM is sent to the WMSM encoder 109, and the geometric area of fixing material is sent to the assembly encoder 111.

By knowing the area of each simulant matter and fixing material, including the WMSM anisotropic directionality in each area of WMSM, each encoder calculates a path that allow a servo to command the position of incremented injector activity. The GMSM encoder determines incremental GMSM position values 107, the WMSM encoder determines incremental WMSM position values 109, and the assembly encoder determines incremental fixing material position values 111. Each encoder transmits position values to a servo that calculates the commands for material injections. The GMSM servo 119 calculates incremental position changes and determines GMSM volume to command downstream processes at each position 123. The WMSM servo 120 calculates incremental position changes and determines WMSM volume with specific anisotropic directionality to command downstream processes at each position 125. The Assembly servo 121 calculates incremental position changes and determines fixing material volume to command downstream processes at each position 127. The GMSM Module activates the GMSM injector 129. The WMSM Module activates the WMSM injector 131. The assembly module activates the assembly injector 133. A specific volume of GMSM passes through to a commanded position 135. A specific volume, with a specific anisotropic directionality, of WMSM passes through to a commanded position 137. A specific volume of fixing material passes through to a commanded position 139. At each successive moment there is an incremental position change 141 of commanded positions. When a layer such as the first layer is completed, a new layer alignment is triggered 143, and the master controller receives data from the next brain scan slice. When all layers are completed the master controller stops the process.

Figure 7:
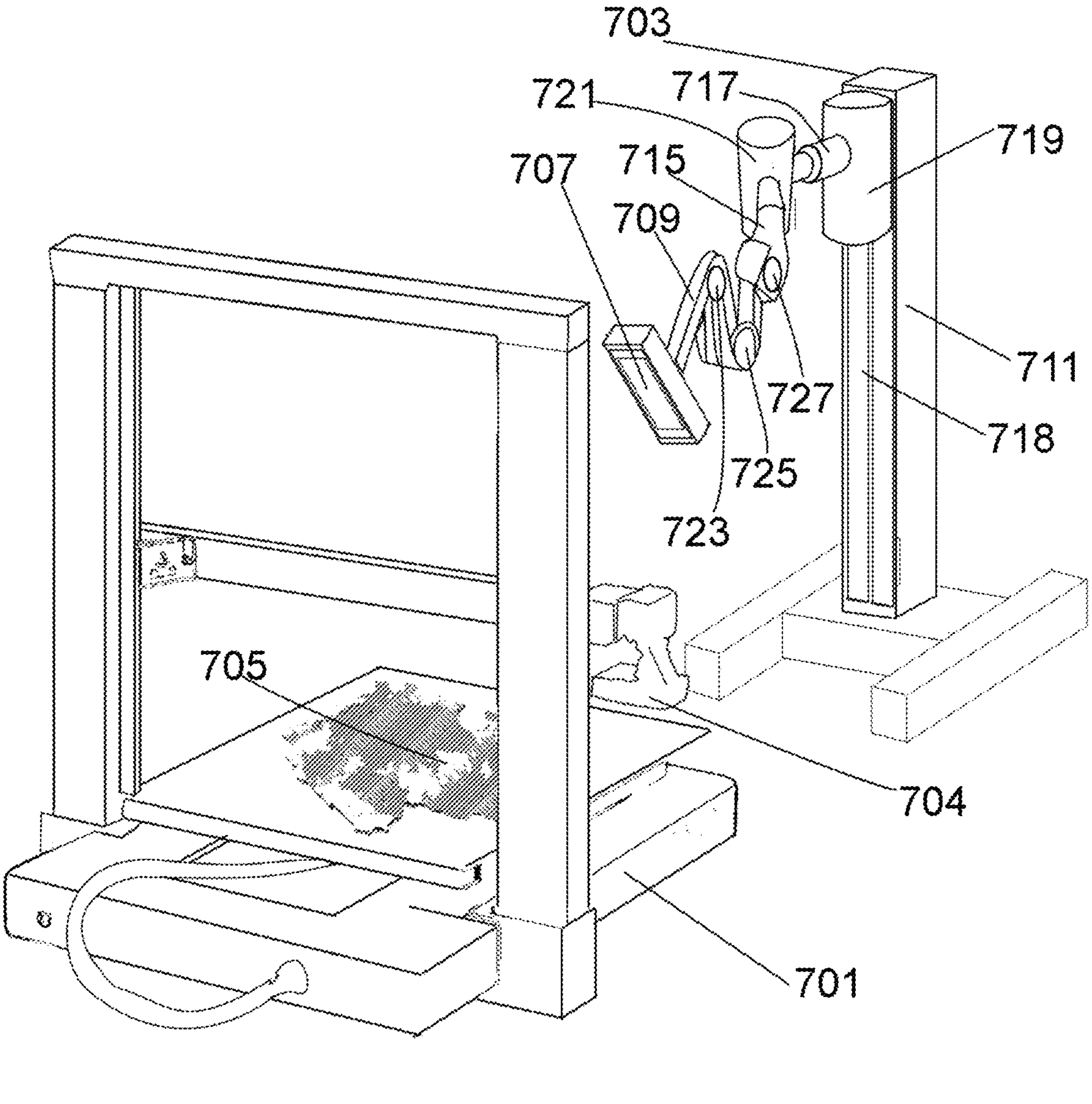
FIG. 7 illustrates an additive printer with a WMSM anisotropic force emitting structure.

In the embodiment in FIG. 7, a three-dimensional additive printer 701 and a robotic arm apparatus 703 that emits a force controlling WMSM anisotropic directionality is illustrated. The additive printer 701 extrudes liquid or flexible WMSM through an extruder 704 at positions 705 determined from a brain scan slice. At each position 705 the WMSM is under the influence of a force, in this case from a magnetic force emitter 707 mounted to an articulating arm 709. The robotic arm apparatus 703 is composed of a housing 711 and a plurality of articulating arms 709, 715, and 717. The housing 711 contains mechanisms 718 to move base 719 in a Z direction. Articulating arm 717 translationally moves in a Y direction, in and out from the base 719. Base 721 contains one or a plurality of gimbal joints that permit movement in one, two, or three orthogonal directions. Articulating arm 709 comprises a plurality of joints 723, 725, and 727 which permits arm rotation about at least two transverse axes, and extension of arm 709 away from and back towards base 721. The position of magnetic force emitter 707 is continuously updated to ensure a force may influence extruded WMSM at all necessary positions.

The invention is not limited in its application to the details of construction and arrangements of the component set forth in the descriptions herein or illustrated in the drawings. The invention is capable of other embodiments.

The invention claimed is:

1. A biomechanically realistic brain model, comprising:

gray matter simulant material comprising at least one monomer or polymer that exhibits isotropic mechanical properties in response to applied forces; and a white matter simulant material comprising at least one monomer or polymer that exhibits anisotropic mechanical properties in response to applied forces, wherein the anisotropic response includes directionally-dependent stress-strain characteristics;

the white matter simulant material comprising at least a first white matter simulant component having a first anisotropic directionality and a second white matter simulant component having a second anisotropic directionality different from the first anisotropic directionality;

wherein the gray matter simulant material and the white matter simulant material are positioned to correspond to gray matter positions and white matter positions, respectively, in a human brain; and wherein the gray matter simulant material and the at least first and second white matter simulant components define one or more interfaces corresponding to gray-white matter interfaces in the human brain.

2. The biomechanically realistic brain model of claim 1, wherein at least one membrane-formed fluid-filled sealed cavity is positioned over an outer surface of the assembled biomechanically realistic brain model and between the assembled biomechanically realistic brain model and a model skull.

3. The biomechanically realistic brain model of claim 1, wherein the white matter simulant material comprises aligned nanofibers formed to impart anisotropic mechanical response.

4. The biomechanically realistic brain model of claim 1, wherein the gray matter simulant material is composed of one or a plurality of silicone elastomers with an elastic modulus less than 2 MPa.

5. The biomechanically realistic brain model of claim 1, wherein the white matter simulant material is synthesized in the presence of one or more external forces configured to orient a plurality of microstructures within the white matter simulant material such that the microstructures are substantially aligned in a predetermined direction.

6. The biomechanically realistic brain model of claim 5, wherein the one or more external forces are mechanical forces.

7. The biomechanically realistic brain model of claim 5, wherein the one or more external forces are magnetic fields.

8. The biomechanically realistic brain model of claim 5, wherein the one or more external forces are electric fields.

9. The biomechanically realistic brain model of claim 5, wherein the one or more external forces are gradients of temperature.

10. The biomechanically realistic brain model of claim 5, wherein the one or more external forces are gradients of ions.

11. The biomechanically realistic brain model of claim 1, wherein at least one of the white matter simulant components comprises a freeze-cast hydrogel formed by directional freezing to create anisotropic ice crystal growth patterns and configured to provide anisotropic directional response corresponding to a white matter area of the human brain.

12. The biomechanically realistic brain model of claim 1, wherein the gray matter simulant material and the white matter simulant material are arranged in a three-dimensional configuration based on a plurality of imaged slices of a human brain.

13. A method of assembling a model brain, the method comprising:

dispensing and fixing, with a dispenser governed by a computer program, a plurality of anisotropic components that respond to applied forces anisotropically, and a plurality of isotropic components that respond to applied forces isotropically, to sequentially form a plurality of layers in a configured pattern, in which each one of the plurality of anisotropic components has a shape with an anisotropic directionality corresponding to a one of a plurality of white matter areas in a one of a plurality of imaged slices of a human brain, and in which each one of the plurality of isotropic components has a shape corresponding to one of a plurality of gray matter areas in the one of the plurality of imaged slices of the human brain, the assembling comprising the steps of:

the dispenser forming a first three-dimensional layer configured to correspond to a first one of the plurality of imaged slices, with at least one first isotropic component of the plurality of isotropic components, and at least one first anisotropic component of the plurality of anisotropic components; the dispensing formation comprising:

dispensing the at least one first isotropic component in a shape with at least a first recess; generating an external force that controls the anisotropy of the at least one first anisotropic component when dispensed;

dispensing the at least one first anisotropic component with directionally-dependent stress-strain characteristics corresponding to an anisotropic directionality of the one of the plurality of white matter areas in the first one of the plurality of imaged slices;

after fixing the first three-dimensional layer of the model brain, the dispenser forming a second three-dimensional layer configured to correspond to a second one of the plurality of imaged slices, with at least one second isotropic component of the plurality of isotropic components, and at least one second anisotropic component of the plurality of anisotropic components;

continuing to assemble three-dimensional layers of the model brain with the dispenser formation.

14. The method as defined in claim 13, wherein the external force that controls the anisotropy of the at least one first anisotropic component is applied prior to dispensing the at least one first anisotropic component.

15. The method as defined in claim 13, wherein the dispenser governed by the computer program is a three-dimensional printing apparatus.

16. The method as defined in claim 13, wherein the dispenser governed by the computer program is a servo-controlled injection apparatus.

17. A biomechanically realistic brain model for a model head form, wherein the biomechanically realistic brain model is configured in a model skull, the model head form comprising at least one membrane-formed fluid-filled sealed cavity positioned over an outer surface of the biomechanically realistic brain model and between the biomechanically realistic brain model and the model skull;

wherein the biomechanically realistic brain model comprises a plurality of isotropic components positioned in locations corresponding to gray matter areas of a human brain and a plurality of anisotropic components positioned in locations corresponding to white matter areas of the human brain; and wherein at least two of the anisotropic components have different anisotropic directionalities corresponding to different directional orientations of white matter fibers in respective white matter areas.

18. The biomechanically realistic brain model of claim 17, wherein the at least one isotropic material and the at least one anisotropic material are cast in place.

* * * * *